(12) United States Patent
Preisler et al.

(10) Patent No.: US 8,808,829 B2
(45) Date of Patent: Aug. 19, 2014

(54) ASSEMBLY INCLUDING A COMPRESSION-MOLDED, COMPOSITE PANEL LOCALLY REINFORCED ADJACENT A LIVING HINGE OF THE ASSEMBLY

(71) Applicant: Global IP Holdings, LLC, Sterling Heights, MI (US)

(72) Inventors: Darius J. Preisler, Macomb, MI (US); Christopher A. Heikkila, Washington Township, MI (US)

(73) Assignee: Global IP Holdings, LLC, Sterling Heights, MI (US)

( * ) Notice: Subject to any disclaimer, the term of this patent is extended or adjusted under 35 U.S.C. 154(b) by 62 days.

(21) Appl. No.: 13/687,213

(22) Filed: Nov. 28, 2012

(65) Prior Publication Data
US 2013/0278019 A1    Oct. 24, 2013

Related U.S. Application Data

(63) Continuation-in-part of application No. 13/453,269, filed on Apr. 23, 2012, and a continuation-in-part of application No. 13/453,201, filed on Apr. 23, 2012, now Pat. No. 8,690,233.

(51) Int. Cl.
| | |
|---|---|
| *B60R 5/04* | (2006.01) |
| *B32B 3/02* | (2006.01) |
| *B29C 43/00* | (2006.01) |
| *B32B 3/26* | (2006.01) |

(52) U.S. Cl.
CPC . *B60R 5/04* (2013.01); *B29C 43/00* (2013.01); *B32B 3/263* (2013.01); *B32B 3/02* (2013.01)
USPC .......... 428/99; 296/39.1; 296/39.2; 296/39.3; 296/97.23; 428/95; 428/98; 428/116

(58) Field of Classification Search
CPC .......... A47G 27/02; B29C 43/00; B32B 3/02; B32B 3/04; B32B 3/12; B32B 3/263; B60R 5/00; B60R 5/04; B60R 13/00; B60R 13/011; B62D 25/20
USPC ............ 428/95, 98, 99, 116; 296/97.23, 39.1, 296/39.2, 39.3
See application file for complete search history.

(56) References Cited

U.S. PATENT DOCUMENTS

| | | |
|---|---|---|
| 5,298,694 A | 3/1994 | Thompson et al. |
| 5,502,930 A | 4/1996 | Burkette et al. |

(Continued)

OTHER PUBLICATIONS

Office Action, corresponding U.S. Appl. No. 13/687,232, date of mailing Mar. 28, 2014.

(Continued)

*Primary Examiner* — Brent O'Hern
(74) *Attorney, Agent, or Firm* — Brooks Kushman P.C.

(57) ABSTRACT

A panel assembly including a compression-molded, composite panel is provided. The panel has first and second outer layers and a core positioned between the outer layers. The core has a large number of cavities. The outer layers are bonded to the core by press molding. The assembly also includes a component pivotally connected to the panel and a living hinge which allows the component to pivot about a pivot axis between different use positions relative to the panel. The assembly further includes a stiffening support having a support axis substantially parallel to the pivot axis. The support is bonded or joined to the panel to locally reinforce the panel adjacent the living hinge. The stiffening support eliminates the need for a metal hinge and provides for a light weight assembly with improved aesthetics and function.

22 Claims, 4 Drawing Sheets

(56) References Cited

U.S. PATENT DOCUMENTS

| | | |
|---|---|---|
| 5,915,445 A | 6/1999 | Rauenbusch |
| 5,979,962 A | 11/1999 | Valentin et al. |
| 6,050,630 A | 4/2000 | Hochet |
| 6,102,464 A | 8/2000 | Schneider et al. |
| 6,435,577 B1 | 8/2002 | Renault |
| 6,537,413 B1 | 3/2003 | Hochet et al. |
| 6,631,785 B2 | 10/2003 | Khambete et al. |
| 6,655,299 B2 | 12/2003 | Preisler et al. |
| 6,659,223 B2 | 12/2003 | Allison et al. |
| 6,682,675 B1 | 1/2004 | Vandangeot et al. |
| 6,682,676 B1 | 1/2004 | Renault et al. |
| 6,748,876 B2 | 6/2004 | Preisler et al. |
| 6,790,026 B2 | 9/2004 | Vandangeot et al. |
| 6,793,747 B2 | 9/2004 | North et al. |
| 6,823,803 B2 | 11/2004 | Preisler |
| 6,843,525 B2 | 1/2005 | Preisler |
| 6,890,023 B2 | 5/2005 | Preisler et al. |
| 6,981,863 B2 | 1/2006 | Renault et al. |
| 7,014,259 B2 | 3/2006 | Heholt |
| 7,090,274 B1 | 8/2006 | Khan et al. |
| 7,093,879 B2 | 8/2006 | Putt et al. |
| 7,264,685 B2 | 9/2007 | Katz et al. |
| 7,320,739 B2 | 1/2008 | Thompson, Jr. et al. |
| 7,402,537 B1 | 7/2008 | Lenda et al. |
| 7,419,713 B2 | 9/2008 | Wilkens et al. |
| 7,837,009 B2 | 11/2010 | Gross et al. |
| 7,909,379 B2 | 3/2011 | Winget et al. |
| 7,918,313 B2 | 4/2011 | Gross et al. |
| 7,919,031 B2 | 4/2011 | Winget et al. |
| 8,117,972 B2 | 2/2012 | Winget et al. |
| 8,622,456 B2 | 1/2014 | Preisler et al. |
| 8,690,233 B2 | 4/2014 | Preisler et al. |
| 2005/0189674 A1 | 9/2005 | Hochet et al. |
| 2006/0255611 A1 | 11/2006 | Smith et al. |
| 2008/0185866 A1 | 8/2008 | Tarrant et al. |
| 2010/0026031 A1* | 2/2010 | Jouraku .................... 296/37.16 |
| 2011/0315310 A1 | 12/2011 | Trevisan et al. |
| 2013/0278002 A1 | 10/2013 | Preisler et al. |
| 2013/0278003 A1 | 10/2013 | Preisler et al. |
| 2013/0278009 A1 | 10/2013 | Preisler et al. |
| 2013/0278015 A1 | 10/2013 | Preisler et al. |
| 2013/0278018 A1 | 10/2013 | Preisler et al. |
| 2013/0278019 A1 | 10/2013 | Preisler et al. |
| 2013/0278020 A1 | 10/2013 | Preisler et al. |
| 2013/0280469 A1 | 10/2013 | Preisler et al. |
| 2013/0280472 A1 | 10/2013 | Preisler et al. |
| 2013/0280473 A1 | 10/2013 | Preisler et al. |
| 2013/0312652 A1 | 11/2013 | Preisler et al. |
| 2013/0316123 A1 | 11/2013 | Preisler et al. |
| 2014/0077518 A1 | 3/2014 | Preisler et al. |
| 2014/0077530 A1 | 3/2014 | Preisler et al. |
| 2014/0077531 A1 | 3/2014 | Preisler et al. |
| 2014/0145465 A1 | 5/2014 | Preisler et al. |
| 2014/0145470 A1 | 5/2014 | Preisler et al. |
| 2014/0147617 A1 | 5/2014 | Preisler et al. |
| 2014/0147622 A1 | 5/2014 | Preisler et al. |

OTHER PUBLICATIONS

Office Action; related U.S. Appl. No. 13/479,974; date of mailing Mar. 20, 2014.
Office Action; related U.S. Appl. No. 13/686,362; date of mailing Mar. 25, 2014.
Office Action; related U.S. Appl. No. 13/523,253; date of mailing Mar. 25, 2014.
Office Action; related U.S. Appl. No. 13/688,972; date of mailing Mar. 28, 2014.
Office Action; related U.S. Appl. No. 13/687,232; date of mailing Mar. 28, 2014.
Office Action; related U.S. Appl. No. 13/689,809; date of mailing Mar. 31, 2014.
Office Action; related U.S. Appl. No. 13/687,213; date of mailing Mar. 31, 2014.
Office Action; related U.S. Appl. No. 13/690,265; date of mailing Mar. 31, 2014.
Office Action; related U.S. Appl. No. 13/762,904; date of mailing Apr. 8, 2014.
Office Action; related U.S. Appl. No. 13/762,800; date of mailing Apr. 8, 2014.
Office Action; related U.S. Appl. No. 13/762,861; date of mailing Apr. 9, 2014.
Office Action; related U.S. Appl. No. 13/690,566; date of mailing Apr. 9, 2014.
Office Action; related U.S. Appl. No. 13/762,832; date of mailing Apr. 11, 2014.
Office Action; related U.S. Appl. No. 13/762,921; date of mailing Apr. 14, 2014.
Notice of Allowance; related U.S. Appl. No. 13/686,388; date of mailing Apr. 15, 2014.
Related U.S. Appl. No. 13/690,566, filed Nov. 30, 2012.
Related U.S. Appl. No. 13/762,921, filed Feb. 8, 2013.
Related U.S. Appl. No. 13/762,956, filed Feb. 8, 2013.
Office Action; related U.S. Appl. No. 13/453,201 (now USPN 8,690,233); date of mailing Nov. 20, 2013.
Office Action; related U.S. Appl. No. 13/523,209 (now USPN 8,622,456) date of mailing Apr. 29, 2013.

* cited by examiner

ASSEMBLY INCLUDING A COMPRESSION-MOLDED, COMPOSITE PANEL LOCALLY REINFORCED ADJACENT A LIVING HINGE OF THE ASSEMBLY

CROSS-REFERENCE TO RELATED APPLICATIONS

This application is a continuation-in-part of both U.S. patent applications entitled "Method of Making a Sandwich-Type Composite Panel Having a Living Hinge and Panel Obtained by Performing the Method" filed Apr. 23, 2012 having U.S. Ser. No. 13/453,269 and U.S. patent application entitled "Carpeted Automotive Vehicle Load Floor Having a Living Hinge" also filed Apr. 23, 2012 and having U.S. Ser. No. 13/453,201, both of which are incorporated by reference herein in their entirety.

TECHNICAL FIELD

This invention relates, in general, to the field of compression-molded, composite panels and, in particular, to assemblies including such panels locally reinforced adjacent living hinges of the assemblies.

Overview

Sandwich-type composite panels including cores have very important characteristics because of their light weight and high strength. Conventionally, such panels are constructed by sandwiching a core having a large number of cavities and having low strength characteristics between two outer layers or skins, each of which is much thinner than the core but has excellent mechanical characteristics.

Figure 1:
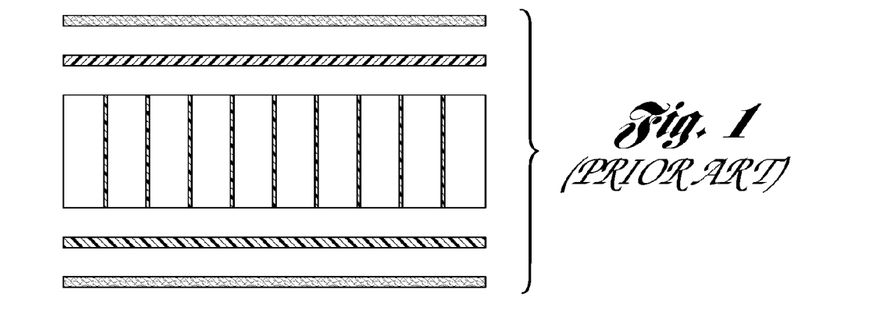
FIG. 1 is a side sectional view showing various separate layers of a prior art stack of thermoplastic-based layers of material.

The prior art discloses a method of making a panel of sandwich-type composite structure having a cellular core in a single processing step. In that method, the panel is made by subjecting a stack of layers of material to cold-pressing in a mold. As shown in FIG. 1, the stack is made up of: at least a first skin made of a reinforced thermoplastics material, a cellular core made of a thermoplastics material, and a second skin also made of a reinforced thermoplastics material. The stack may also include one or more external covering layers made of a woven or nonwoven thermoplastic material. The skins may be pre-heated outside the mold or heated inside the mold to a softening temperature.

Figure 2:
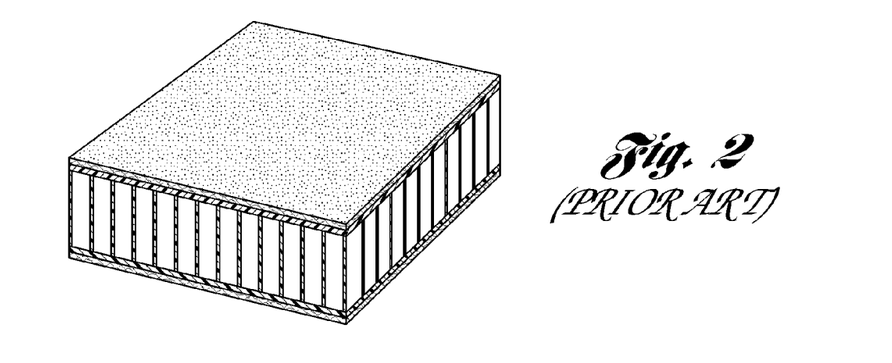
FIG. 2 is a top perspective sectional view of the stack of FIG. 1 after compression molding.

Such a method is particularly advantageous because of the fact that it makes it possible, in a single operation, to generate cohesion and bonding between the various layers of the composite structure as shown in FIG. 2, and to shape the resulting panel while preserving all of the mechanical properties imparted by the cellular-core, sandwich structure.

Panels of sandwich-type composite structure having a cellular core have rigidity characteristics sufficient to enable mechanical structures subjected to large stresses to be reinforced structurally without making them too heavy. Such panels are in common use in shipbuilding, aircraft construction, and rail vehicle construction.

To maximize the functionality of such panels, it is known, in particular, that hinges can be added so that the panels can be hinged to other panels. Such hinges typically are separate parts that are fixed to the panels by gluing, welding, riveting, or some other fastening technique.

Such hinges are fixed to the sandwich-structure composite panels in a separate and subsequent operation, after said panels have been formed. That subsequent operation requires an additional workstation, be it automated or otherwise, which increases, in particular, the manufacturing time and cost of the finished parts.

In addition, the fact that separate, external parts are mounted on a composite panel of the sandwich-type is a source of quality defects, and thus adds to the cost of making such panels.

Figure 3:
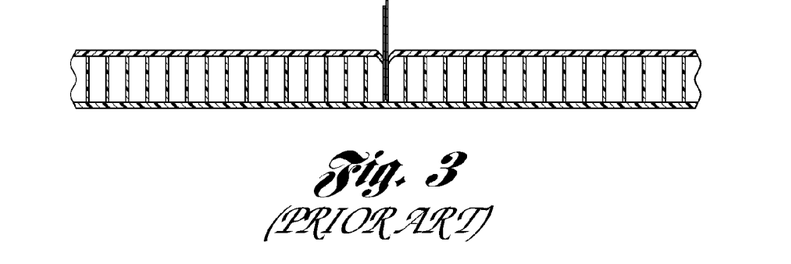
FIGS. 3 and 4 are side views, partially broken away and in cross section, of a prior art sandwich-type composite panel having a living hinge and method of making the living hinge.
Figure 4:
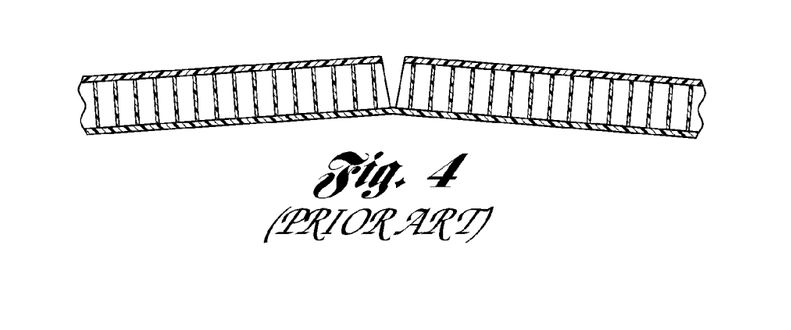
Figure 5:
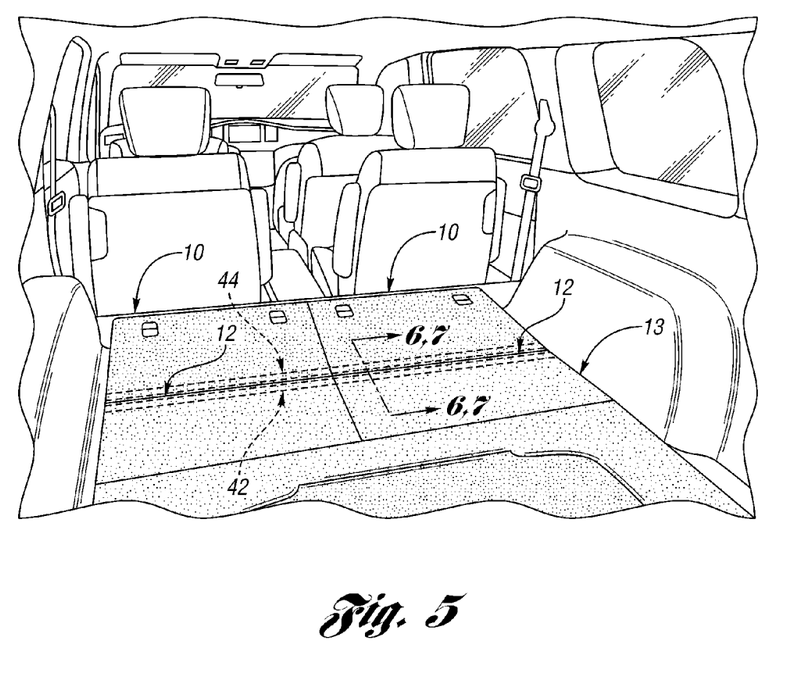
FIG. 5 is an environmental view, partially broken away, of a carpeted automotive vehicle load floor including a pair of carpeted, sandwich-type, compression-molded, composite panel assemblies each being constructed in accordance with at least one embodiment of the present invention.

Published U.S. Patent Application 2005/0189674 discloses a method of making a composite panel of sandwich structure provided with a hinge. The panel includes a stack made up of a first skin of a reinforced thermoplastics material, a cellular core made of a thermoplastics material, and a second skin made of a reinforced thermoplastics material. The panel is formed by pressing the stack in a mold. The first and second skins are preheated to a softening temperature. As shown in FIGS. 3 and 4, after the panel has formed, an incision is made at a determined place in the panel so as to cut through one of the first and second skins, and substantially through the entire thickness of the cellular core, while leaving the other skin intact so that it forms a living hinge between two portions of the incised panel.

Other U.S. patent documents related to the present invention include: U.S. Pat. Nos. 5,298,694; 5,502,930; 5,915,445; 5,979,962; 6,050,630; 6,102,464; 6,435,577; 6,537,413; 6,631,785; 6,655,299; 6,659,223; 6,682,675; 6,793,747; 6,748,876; 6,790,026; 6,682,676; 6,823,803; 6,843,525; 6,890,023; 6,981,863; 7,014,259; 7,090,274; 7,093,879; 7,264,685; 7,320,739; 7,402,537; 7,419,713; 7,837,009; 7,909,379; 7,918,313; 7,919,031; 8,117,972; 2006/0255611; 2008/0185866 and 2011/0315310.

One problem associated with prior art assemblies having such panels as load floors in the automotive industry is that the assemblies typically require many assembly steps often involving costly labor which adds to the cost and time of assembly manufacture. Also, some of the materials making up such assemblies are often non-recyclable.

Some panel assemblies such as load floor assemblies have components which are pivotable via metal hinges. However, such hinges are often unsightly and heavy and the components are difficult and unwieldly to pivot with a single hand. While the use of living hinges is known, such hinges often do not comply with OEM deflection criteria in an automotive setting.

SUMMARY

An object of at least one embodiment of the present invention is to provide an assembly, such as a vehicle floor panel assembly, including a hinged component, which is lightweight, and aesthetically pleasing wherein the hinged component is capable of withstanding repeated cyclic loading without the need for a metal hinge while still complying with OEM deflection criteria.

In carrying out the above object and other objects of at least one embodiment of the present invention, a panel assembly including a compression-molded, composite panel is provided. The panel has first and second outer layers and a core positioned between the outer layers. The core has a large number of cavities. The outer layers are bonded to the core by press molding. Both outer layers have an outer surface. The assembly also includes a component pivotally connected to the panel and a living hinge which allows the component to pivot about a pivot axis between different use positions relative to the panel. The assembly further includes a stiffening support having a support axis substantially parallel to the pivot axis. The support is bonded or joined to the panel to locally reinforce the panel adjacent the living hinge.

A crushed portion of the composite panel adjacent the living hinge may have a reduced thickness to form a depression which receives the stiffening support. Thickness of the stiffening support may be substantially equal to depth of the depression.

The first outer layer may be a load-bearing outer layer made of reinforced thermoplastic material.

Each of the outer layers may be made of a reinforced thermoplastic material.

The stiffening support may be u-shaped in cross-section.

The component may include a compression-molded, composite panel portion of the panel. The panel portion may have third and fourth outer layers. Each of the third and fourth outer layers has an outer surface.

A portion of the first and third outer layers may at least partially form the living hinge.

The assembly may also include a stiffening second support having a second support axis substantially parallel to the pivot axis. The second support is bonded or joined to the component to locally reinforce the component adjacent the living hinge.

A crushed portion of the panel portion adjacent the living hinge may have a reduced thickness to form a pocket which receives the second support. Thickness of the second support may be substantially equal to depth of the pocket.

The assembly may further include a substantially continuous carpet layer bonded to the outer surface of the first outer layer to form a carpeted panel. A portion of the carpet layer may at least partially form the living hinge.

The substantially continuous carpet layer may be bonded to the outer surface of the first outer layer and the outer surface of the third outer layer.

The panel portion may include a second core having a large number of cavities positioned between the third and fourth outer layers. The third and fourth outer layers are bonded to the second core by press molding.

The first and third outer layers may comprise a single fiber-reinforced layer.

A portion of the fiber-reinforced layer between the first and third outer layers may at least partially form the living hinge.

A crushed portion of the composite panel may at least partially form the living hinge.

The stiffening support may be made of plastic wherein the stiffening support may be welded to the outer surface of the second outer layer.

Each of the supports may be made of plastic.

A portion of the second outer layer may at least partially form the living hinge.

Further in carrying out the above object and other objects of at least one embodiment of the present invention, a vehicle panel assembly including a compression-molded, composite panel is provided. The panel has first and second outer layers and a core positioned between the outer layers. The core has a large number of cavities. The outer layers are bonded to the core by press molding. Both outer layers have an outer surface. The assembly also includes a component pivotally connected to the panel and a living hinge which allows the component to pivot about a pivot axis between different use positions within the vehicle relative to the panel. The assembly further includes a stiffening support having a support axis substantially parallel to the pivot axis. The support is bonded or joined to the panel to locally reinforce the panel adjacent the living hinge.

Still further in carrying out the above object and other objects of at least one embodiment of the present invention, a vehicle floor panel assembly including a compression-molded, composite panel is provided. The panel has first and second outer layers and a core positioned between the outer layers. The core has a large number of cavities. The outer layers are bonded to the core by press molding. The first outer layer has a top support surface and the second outer layer has a bottom surface. The assembly also includes a component pivotally connected to the panel and a living hinge which allows the component to pivot about a pivot axis between different use positions within the vehicle relative to the panel. The assembly further includes a stiffening support having a support axis substantially parallel to the pivot axis. The support is bonded or joined to the panel to locally reinforce the panel adjacent the living hinge.

Other technical advantages will be readily apparent to one skilled in the art from the following figures, descriptions and claims. Moreover, while specific advantages have been enumerated, various embodiments may include all, some or none of the enumerated advantages.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Referring now to the FIGS. 5, 6, 7, 8, 9, 10 and 11 different embodiments of an assembly including a compression-molded composite panel with a supported living hinge are provided. In one example embodiment, a carpeted automotive vehicle load floor, generally indicated at 13, includes a pair of carpeted, compression-molded, sandwich-type, composite hinged panel assemblies, generally included at 10. In one embodiment of FIG. 6, the assembly 10 has a living hinge, generally indicated at 12, and in second, third, fourth, fifth, and sixth embodiments, each assembly 10 of FIGS. 7, 8, 9, 10 and 11, respectively, also has a living hinge 12. It is to be understood that one or more panel assemblies 10 constructed in accordance with at least one embodiment of the present invention may be used in a wide variety of environments besides the automotive vehicle environment of FIG. 5.

Each panel, generally included at 15, of each panel assembly 10 of FIGS. 6-11 is typically manufactured by providing a stack of materials located or positioned within a mold. The stack includes first and second reinforced thermoplastic skins or outer layers 16 and 18, respectively, a core having a large number of cavities such as a thermoplastic cellular core 20 disposed between and bonded to the skins 16 and 18 by press molding within the mold. A substantially continuous covering or carpet layer, generally indicated at 34, made of thermoplastics material covers and is bonded to the first skin 16 to provide a top carpeted support surface 22. The skins 16 and 18 are heated typically outside of the mold to a softening temperature. The mold is preferably a low-pressure, compression mold which performs a thermo-compression process on the stack of materials.

The panel 15 is divided into first and second portions, the second portion or component comprising a compression-molded, composite panel portion, generally indicated at 24, pivotally connected to the first portion of the panel 15 by the living hinge 12. As shown in each of the different embodiments of FIGS. 6-11, the outer layer skin 16 is continuous and is bonded to the core 20 and a core 20' of the panel portion 24. The outer skin 18 may be divided into a first part or portion 19 bonded to the core 20 and a second part or portion 21 bonded to the core 20'. The panel portion 24 is pivotally connected to the first portion of the panel 15 by the living hinge 12. The outer skin 18 may be continuous as shown in FIGS. 9 and 10 or discontinuous as shown in FIGS. 6-8 and 11.

Figure 6:
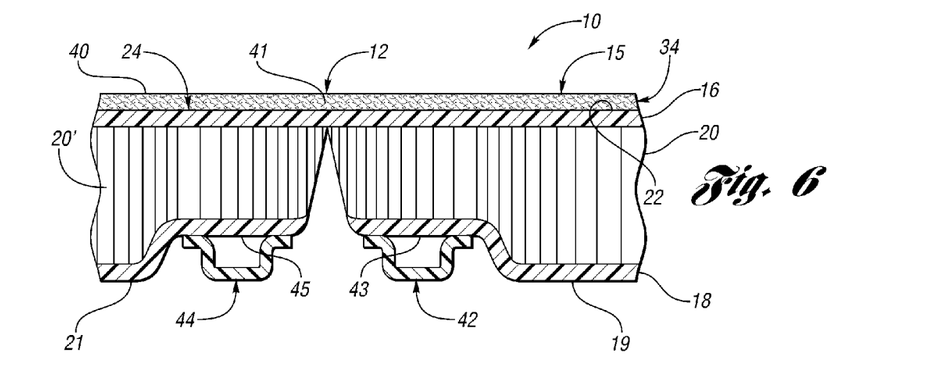
FIG. 6 is a side view, partially broken away and in cross section, of one embodiment of one of the panel assemblies taken along lines 6-6 of FIG. 5.
Figure 7:
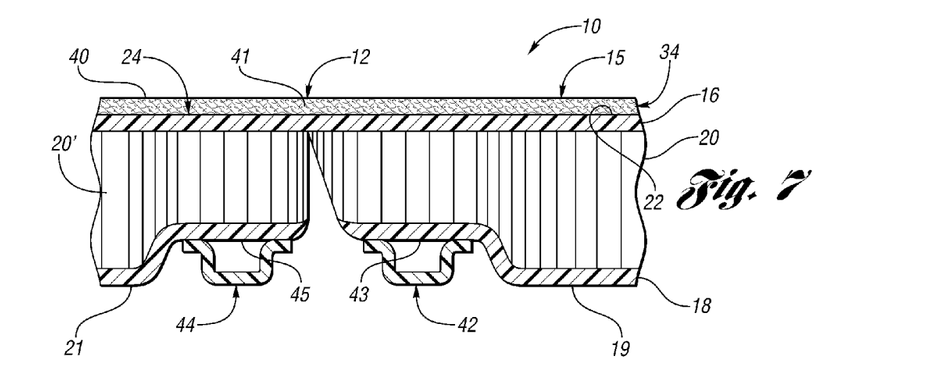
FIG. 7 is a view, similar to the view of FIG. 6, but showing a second embodiment of one of the panel assemblies taken along lines 7-7 of FIG. 5.
Figure 8:
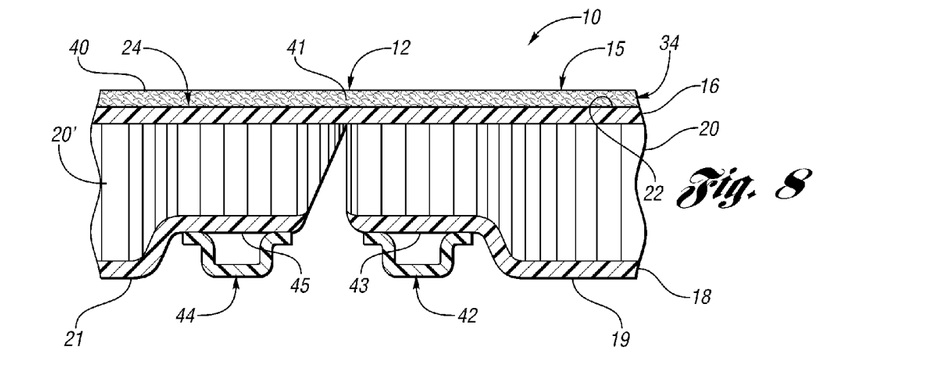
FIG. 8 is a view similar to the views of FIGS. 6 and 7, showing a third embodiment.

The living hinge 12 may be formed by a symmetrical cut through the skin 18 and the crushed core as shown in FIG. 6. Alternatively, the living hinge 12 may be formed by an asymmetrical cut through the skin 18 and the crushed core as shown in FIGS. 7 and 8.

Figure 9:
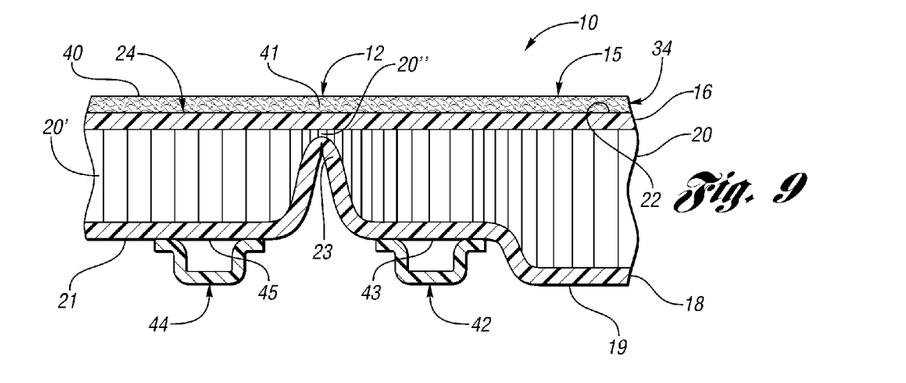
FIG. 9 is a view similar to the views of FIGS. 6, 7 and 8, showing a fourth embodiment.

As shown in FIG. 9, the living hinge is formed by crushing intermediate top and bottom portions of the panel 15 to form a crushed core 20" and a bent portion 23 of the skin 18.

Figure 10:
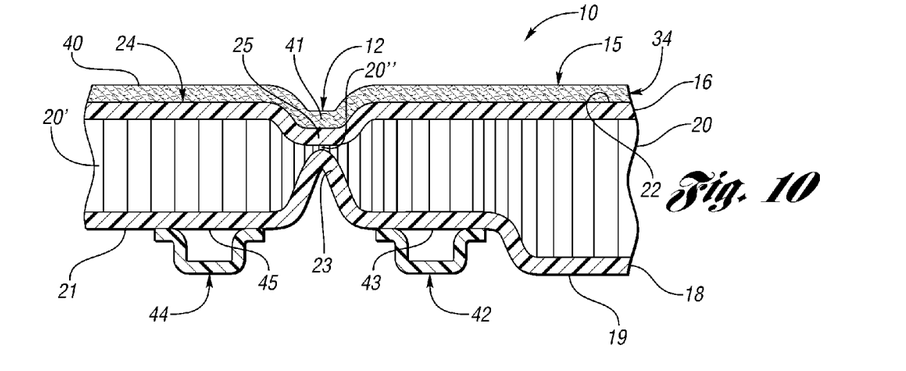
FIG. 10 is a view, similar to the views of FIGS. 6, 7, 8 and 9, showing a fifth embodiment.

As shown in FIG. 10, the living hinge 12 is formed by crushing intermediate top and bottom portions of the skin 16 and a bent portion 23 of the lower skin 18. In each embodiment, the living hinge 12 allows the component or panel portion 24 to pivot between different use positions relative to the first portion of the panel 15.

Figure 11:
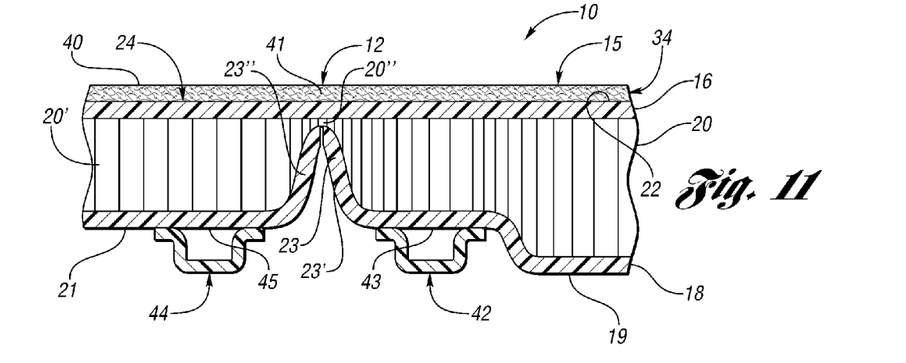
FIG. 11 is a view, similar to the views of FIGS. 6, 7, 8, 9 and 10, showing a sixth embodiment.

As shown in FIG. 11, the living hinge 12 is formed by crushing an intermediate bottom portion of the panel 15 to form a crushed core 20" and a bent portion 23 of the lower skin 18. The bent portion 23 is broken into portions 23' and 23".

A portion 40 of the thermoplastic carpet layer 34 covers and is bonded to an upper surface of the component or panel portion 24 to provide an upper carpeted support surface. An intermediate portion 41 of the layer 34 at least partially forms the living hinge 12. The living hinge 12 allows the carpeted component or panel portion 24 to pivot between the different use positions.

The panel assembly 10 also includes at least one and preferably two plastic stiffening supports or u-shaped bars 42 and 44 which extend across the width of the storage area at the under surface of the assembly 10 to support the first and second portions of the panel 15 of the assembly 10 adjacent the living hinge 12.

The plastic bars 42 and 44 are bonded or joined to their respective plastic part or portions 19 and 21, respectively, of the plastic lower skin 19. A wide variety of welding technologies exist to join or bond the plastic components together such as: ultrasonic welding; vibration welding; thermal welding; spin welding; infrared welding; hot plate welding; and laser welding. U.S. Pat. Nos. 6,066,217 and 5,026,445 are examples of such welding technologies. Also, a wide variety of adhesives such as liquid and heat-sensitive solid film adhesive may be used to join the plastic components together. Oftentimes a mold is used in the bonding process. U.S. patent documents U.S. Pat. Nos. 8,133,419; 5,534,097 and 2011/0315310 are examples.

Each of the stiffening supports 42 and 44 has a support axis substantially parallel to a pivot axis of the living hinge 12. Each support 42 or 44 is bonded to the panel 15 or panel portion 24, respectively, to locally reinforce the panel 15 or panel portion 24, respectively, adjacent the living hinge 12.

A crushed portion of the composite panel 15 adjacent the living hinge 12 has a reduced thickness to form a depression 43 which receives the stiffening support 42 wherein thickness of the stiffening support 42 is substantially equal to depth of the depression 43.

A crushed portion of the panel portion 24 adjacent the living hinge 12 has a reduced thickness to form a pocket 45 which receives the second support 44 wherein thickness of the second support 44 is substantially equal to depth of the pocket 45.

The carpet layer 34 may be a resin carpet and the resin may be polypropylene. The carpet layer 34 may be made of a woven or nonwoven material (typically of the carpet type).

The cellular core 20 (as well as the core 20') may be a honeycomb core. In this example, the cellular cores 20 and 20' have an open-celled structure of the type made up of tubes or a honeycomb, and it is made mainly of polyolefin and preferably of polypropylene. It is also possible to use a cellular structure having closed cells of the foam type.

Each of the skins 16 and 18 may be fiber reinforced. The thermoplastic of the skins 16 and 18, the covering carpet layer 34 and the cores 20 and 20' may be polypropylene. At least one of the skins 16 and 18 may be a woven skin, such as polypropylene skin. Each of the skins 16 and 18 may be reinforced with fibers, e.g., glass fibers, carbon fibers or natural fibers. At least one of the skins 16 and 18 may advantageously be made up of woven glass fiber fabric and of a thermoplastics material.

Each resulting hinged panel assembly 10 may have a thickness in the range of 5 to 25 mm. The depression 43 and/or the pocket 45 may have a depth in the range of 2 to 10 mm.

In one example method of making the hinged panel assembly 10, stacks of material are pressed in a low pressure, cold-forming mold. With respect to a first part of the hinged panel assembly 10, the stack is made up of the first skin 16, the cellular core 20, the second skin 18 and a portion of the covering layer 34, and is pressed at a pressure lying in the range of $10 \times 10^5$ Pa. to $30 \times 10^5$ Pa. The first and second skins 16 and 18 are preferably pre-heated to make them malleable and stretchable. Advantageously, in order to soften the first and second skins 16 and 18, respectively, heat is applied to a pre-assembly constituted by the stack made up of at least the first skin 16, of the cellular core 20, and the second skin 18 so that, while the first part of the panel of the assembly 10 is being formed in the mold, the first and second skins 16 and 18 have a forming temperature lying approximately in the range of 160° C. to 200° C., and, in this example, about 180° C. The living hinge 12 may be formed by performing the method of the above-noted patent application entitled "Method of Making a Sandwich Type Composite Panel Having a Living Hinge and Panel Obtained by Performing the Method."

The covering carpet layer 36 is substantially continuous and may be formed from separate pieces of thermoplastic resin carpet which are subsequently bonded or fused together, such as by heat and/or pressure to carpet the entire top support surface of the hinged panel assembly 10.

In summary, FIGS. 6-11 show first, second, third, fourth, fifth, and sixth embodiments, respectively, of a carpeted, sandwich-type, composite hinged panel assembly 10. Each assembly 10 has basically the same structure and function.

Typical OEM deflection criteria are as follows:
Max Allowable Deflection Range: 8-15 mm;
Load Surface Size: 4" Diameter or 10"×10" square;
Test Temperature: −30 C., ambient, 85 C.;
Surrounding Support: Depends on application, but mainly 4-sided support; and
Other Requirements: No part damage or permanent set greater than 3 mm While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A panel assembly comprising:
a compression-molded, composite panel having first and second outer layers and a core positioned between the outer layers and having a plurality of cavities wherein the outer layers are bonded to the core by press molding, both outer layers having an outer surface;
a component pivotally connected to the panel;
a living hinge which allows the component to pivot between different use positions relative to the panel; and
a stiffening support bonded or joined to the panel to locally reinforce the panel adjacent the living hinge wherein a crushed portion of the composite panel adjacent the living hinge has a reduced thickness to form a depression which receives the stiffening support.

2. The assembly as claimed in claim 1, wherein thickness of the stiffening support is substantially equal to depth of the depression.

3. The assembly as claimed in claim 1, wherein the first outer layer is a load-bearing outer layer made of reinforced thermoplastic material.

4. The assembly as claimed in claim 3, wherein each of the outer layers is made of a reinforced thermoplastic material.

5. The assembly as claimed in claim 1, wherein the stiffening support is u-shaped in cross-section.

6. The assembly as claimed in claim 1, wherein the component comprises a compression-molded, composite panel portion of the panel, the panel portion having third and fourth outer layers, each of the third and fourth outer layers having an outer surface.

7. The assembly as claimed in claim 6, wherein a portion of the first and third outer layers at least partially forms the living hinge.

8. The assembly as claimed in claim 1, further comprising a stiffening second support bonded or joined to the component to locally reinforce the component adjacent the living hinge.

9. The assembly as claimed in claim 6, further comprising a stiffening second support having a second support axis substantially parallel to the pivot axis, the second support being bonded or joined to the panel portion to locally reinforce the panel portion adjacent the living hinge.

10. The assembly as claimed in claim 9, wherein a crushed portion of the panel portion adjacent the living hinge has a reduced thickness to form a pocket which receives the second support and wherein thickness of the second support is substantially equal to depth of the pocket.

11. The assembly as claimed in claim 1, further comprising a substantially continuous carpet layer bonded to the outer surface of the first outer layer to form a carpeted panel, a portion of the carpet layer at least partially forming the living hinge.

12. The assembly as claimed in claim 6, further comprising a substantially continuous carpet layer bonded to the outer surface of the first outer layer and the outer surface of the third outer layer.

13. The assembly as claimed in claim 6, wherein the panel portion includes a second core having a plurality of cavities positioned between the third and fourth outer layers and wherein the third and fourth outer layers are bonded to the second core by press molding.

14. The assembly as claimed in claim 13, wherein the first and third outer layers comprise a single fiber-reinforced layer.

15. The assembly as claimed in claim 14, wherein a portion of the fiber-reinforced layer between the first and third outer layers at least partially forms the living hinge.

16. The assembly as claimed in claim 1 wherein a crushed portion of the composite panel at least partially forms the living hinge.

17. The assembly as claimed in claim 1, wherein the stiffening support is made of plastic and wherein the stiffening support is welded to the outer surface of the second outer layer.

18. The assembly as claimed in claim 8, wherein each of the supports is made of plastic.

19. The assembly as claimed in claim 1, wherein a portion of the second outer layer at least partially forms the living hinge.

20. A vehicle panel assembly comprising:
a compression-molded, composite panel having first and second outer layers and a core positioned between the outer layers and having a plurality of cavities wherein the outer layers are bonded to the core by press molding, both outer layers having an outer surface;
a component pivotally connected to the panel;
a living hinge which allows the component to pivot between different use positions within the vehicle relative to the panel; and
a stiffening support bonded or joined to the panel to locally reinforce the panel adjacent the living hinge wherein a crushed portion of the composite panel adjacent the living hinge has a reduced thickness to form a depression which receives the stiffening support.

21. A vehicle floor panel assembly comprising:
a compression-molded, composite panel having first and second outer layers and a core positioned between the outer layers and having a plurality of cavities wherein the outer layers are bonded to the core by press molding, the first outer layer having a top support surface and the second outer layer having a bottom surface;
a component pivotally connected to the panel;
a living hinge which allows the component to pivot between different use positions within the vehicle relative to the panel; and a stiffening support bonded or joined to the panel to locally reinforce the panel adjacent the living hinge wherein a crushed portion of the composite panel adjacent the living hinge has a reduced thickness to form a depression which receives the stiffening support.

22. A panel assembly comprising:

a compression-molded, composite panel having first and second outer layers and a core positioned between the outer layers and having a plurality of cavities wherein the outer layers are bonded to the core by press molding, both outer layers having an outer surface;

a component pivotally connected to the panel;

a living hinge which allows the component to pivot between different use positions relative to the panel; and a stiffening support bonded or joined to the panel to locally reinforce the panel adjacent the living hinge wherein a crushed portion of the composite panel at least partially forms the living hinge.

* * * * *